INVENTORS:
JOHN F. SWEENEY
EDWARD T. ABLE
IRWIN A. MACKAY
BY Bertha L. MacGregor
ATTORNEY DISK RECORD VENDING MACHINE
Filed Feb. 24, 1947 4 Sheets-Sheet 2
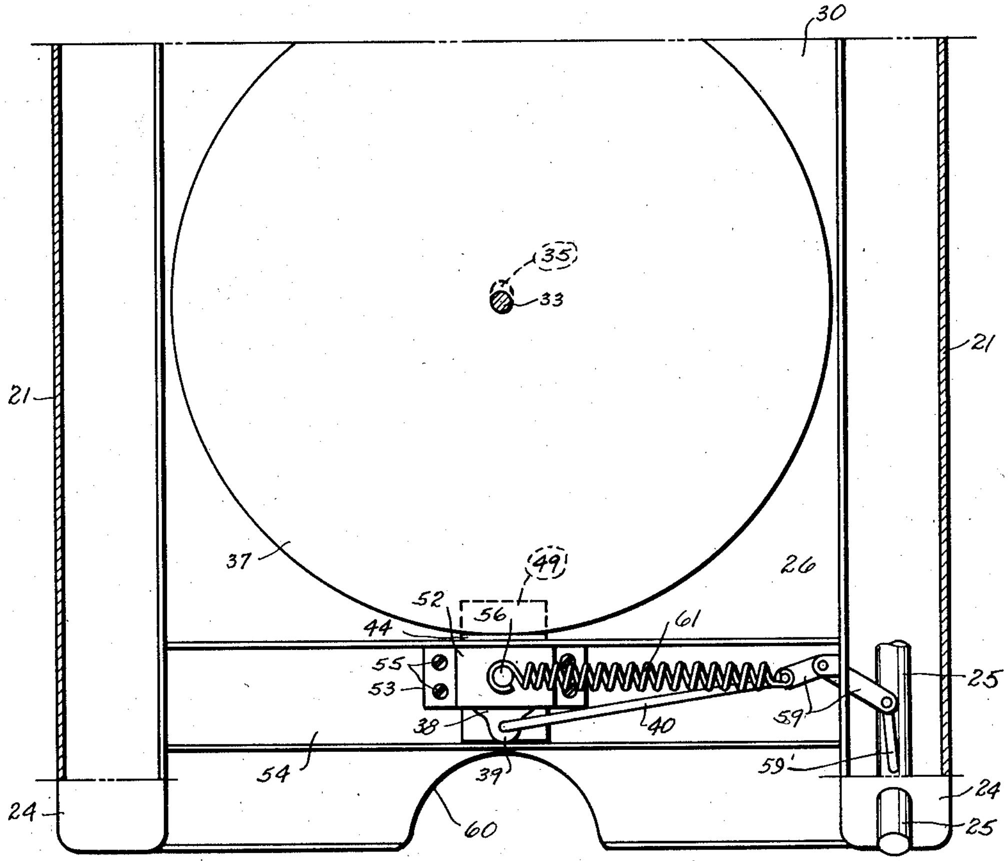
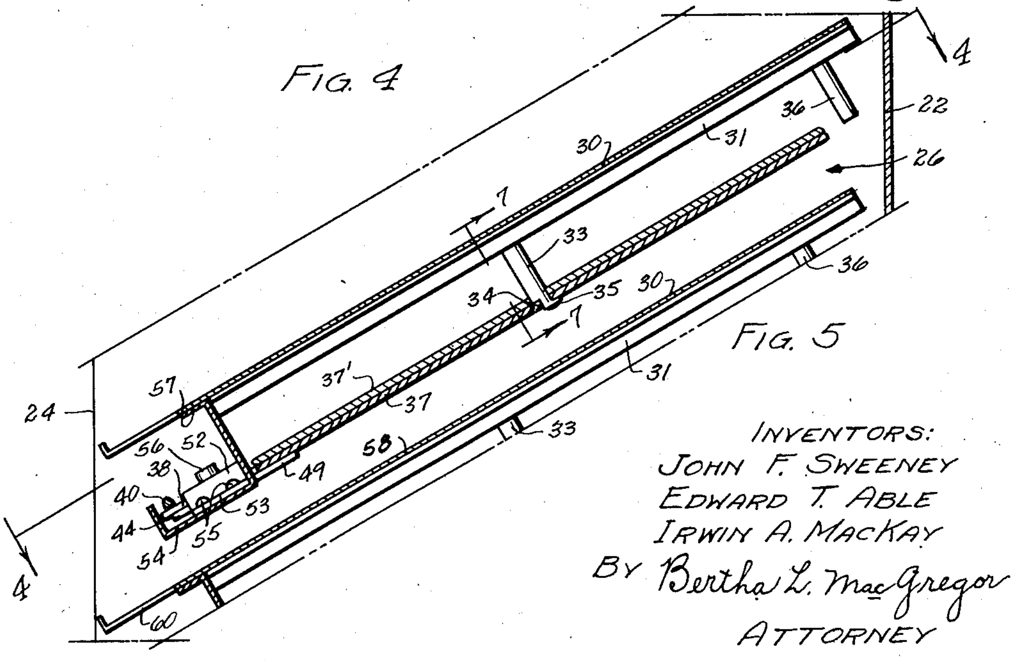
FIG. 4
FIG. 5
INVENTORS:
JOHN F. SWEENEY
EDWARD T. ABLE
IRWIN A. MACKAY
BY Bertha L. MacGregor
ATTORNEY

DISK RECORD VENDING MACHINE

Filed Feb. 24, 1947 4 Sheets-Sheet 3

INVENTORS:
JOHN F. SWEENEY
EDWARD T. ABLE
IRWIN A. MACKAY
BY Bertha L. McGregor
ATTORNEY INVENTORS:
JOHN F. SWEENEY
EDWARD T. ABLE
IRWIN A. MACKAY
BY Bertha L. MacGregor
ATTORNEY Patented Dec. 26, 1950 2,535,332

UNITED STATES PATENT OFFICE 2,535,332

DISK RECORD VENDING MACHINE

John F. Sweeney, Edward T. Able, and Irwin A. MacKay, Denver, Colo., assignors to B. K. Sweeney Manufacturing Company, Denver, Colo., a corporation of Colorado Application February 24, 1947, Serial No. 730,384

3 Claims. (Cl. 312—70)

This invention relates to disk record vending machines, and particularly to means for storing a plurality of groups of records and for dispensing selected records.

The main object of the invention is to provide simple and efficient means for storing a plurality of groups of disk records preferably encased in conventional paper envelopes, and efficient means for dispensing selected records, one by one, while thus encased and protected.

Another object of the invention is to provide mechanism of the character described, which operates within limited space, and in which stored records are moved to dispensing position with a minimum of lateral movement, and substantially within the area occupied by a disk record. The construction herein disclosed overcomes the objections which attend prior art mechanisms designed to move records laterally and which therefore require substantial space outside of the surface area of the record for movement of the record from its storage position to its dispensing position.

Our improved vending machine operates efficiently to dispense records protected by paper envelopes. In machines designed to have the records stacked one above the other on a support and dispensed by laterally movable devices which cause the uppermost disk to move laterally on the subjacent disk, considerable frictional resistance has to be overcome in order to move the selected record on said subjacent disk to a position clear thereof, and consequently it has been found impractical to encase the disk records and to gain the advantage of such protection for the records, not only while in storage but after they have been dispensed to a purchaser. Our machine avoids frictional engagement between the records while they are being dispensed.

Our record dispensing means are controlled by coin actuated mechanism which does not constitute the subject matter of claims in the present invention. Various types of coin controlled mechanisms known in the vending machine art may be embodied in the construction herein shown and described.

Other objects and advantages of the invention will be apparent from the following description.

In the drawings:

Fig. 4 is a sectional view, partly in elevation, taken in the inclined plane indicated by the line 4—4 on Figs. 2 and 5, looking downwardly on a disc record and on mechanism for moving a record to dispensing position.

Fig. 5 is a vertical sectional view showing one of a plurality of storage chambers wherein records are stored and from which they are dispensed; two records being shown in the positions they occupy prior to actuation of the dispensing mechanism.

Figure 1:
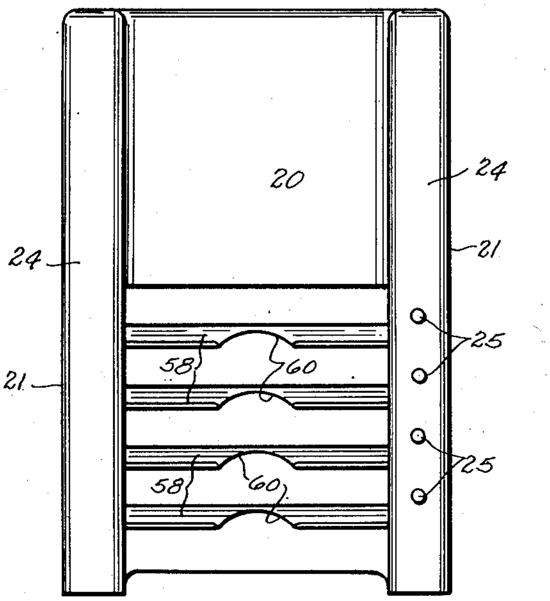
Fig. 1 is a front elevation of a disk record vending machine embodying our invention.

As shown in Figs. 1 to 4, inclusive, the disk record vending machine comprises a housing consisting of a horizontally slotted front wall 20, side walls 21, 21, rear wall 22 and top 23. The front wall has side members 24, one of which has mounted therein a series of plungers 25. One plunger 25 is provided for each of a series of storage chambers 26, to be described in detail hereinafter.

Figure 2:
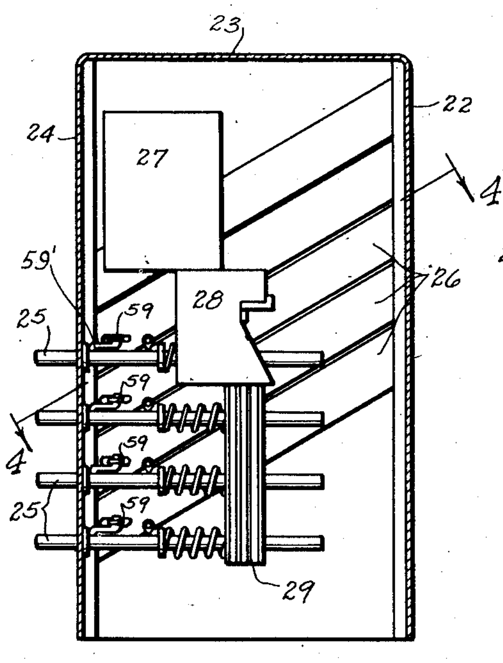
Fig. 2 is a side elevation of the machine with the outer casing removed.
Figure 3:
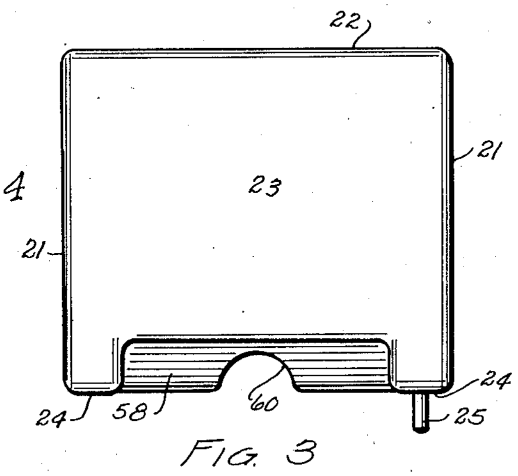
Fig. 3 is a top plan view of the machine shown in Fig. 1.

In Fig. 2 we have indicated a housing 27 which is designed to contain any conventional coin receiving mechanism, and a housing 28 which holds the coin actuated mechanism which controls rods 29 which lock and unlock plungers 25. Each of the plungers 25 is operatively connected with actuating mechanism which controls the dispensing of the records in one storage chamber 26. Since the coin receiving mechanism and the coin actuated mechanism which controls the plungers 25 are not part of the subject matter of this application, they need not be described in detail. Suffice to say that one plunger 25 will be rendered operable when a predetermined number and denominations of coins have been deposited in the housing 27, and the remaining plungers 25 will be locked in inoperative position so that the vendee will receive one record from the selected storage chamber associated with the operable plunger 25.

Any desired number of storage chambers 26 may be provided. Being identical, only one need be described. They are located one above the other, in inclined planes, sloping forwardly and downwardly, as shown in Figs. 2, 5, 6A, 6B and 6C. Each chamber 26 is provided with an inclined ceiling 30 which may be the floor of the chamber above it, and the ceiling 30 has mounted on it a pair of tracks 31, 31, which are spaced apart transversely and form a drawer adapted to receive and to slidably support a record carrying device comprising an elongated flat sided bar 32 provided midway between its ends with a depending holder 33 best shown in Fig. 7. The holder 33 is in the form of a round rod cut away on its forward face near its lower end at 34 to form a right angle shoulder, and terminating in a rearwardly directed shelf member 35. The upper surface of the shelf 35 is in a plane below the cut away surface 34 a distance equal to the thickness of a record. The round rod or body portion of the holder 33 is of such diameter that it can extend through the conventional central openings of disk records.

As shown in Fig. 5, the holder 33 depends at a right angle from the bar 32 which is parallel with the tracks 31 and with the inclined chamber ceiling 30, thus causing the holder 33 to be disposed downwardly and rearwardly in the chamber 26. The bar 31 of the record carrier has a depending stud 36 at its rearward end which serves as a handle for the bar when it is moved into and out of the drawer formed by the tracks 31.

A plurality of disk records 37 are placed on the holder 33, after the record holding device has been removed from the tracks 31, said holder extending through the central opening in the records, and the lowermost record 37 resting on the shelf 35 and supporting the other records above it. Then the carrier and records are placed in the chamber 26, with the bar 32 in the tracks 31, in the position shown in Fig. 5, the records and carrier being spaced from the floor of the chamber as shown. The forward edge of the lower record 37 is supported on record actuating mechanism about to be described.

Figure 14:
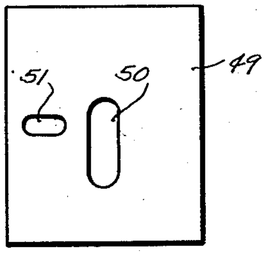

The record actuating mechanism is shown in detail in Figs. 8 to 14, inclusive, and in assembled position in a chamber 26, in Figs. 4, 5, 6A, 6B and 6C. Said mechanism comprises a flat plate 38 having a forwardly directed ear 39 apertured to receive the hook end of an operating lever 40. The plate 39 is centrally apertured at 41 and it has two pins depending from its lower surface, the pin 42 being longer than the pin 43. The plate 38 rests on a second or intermediate plate 44 which is provided with slots 45, 46 and 47, and cut away at its forward edge as indicated at 48, and shown in Fig. 13. The plate 44 rests on a third or bottom plate 49, slotted at 50 and 51, as shown in Fig. 14.

The plates 38, 44 and 49 are held in assembled position by means of a strap 52 shown in Figs. 8 to 11, inclusive. The strap 52 has flat end members 53 adapted to be secured to a supporting bracket 54, as shown in Figs. 4 and 5, by means of screws 55. Between the ends 53, the strap 52 is raised to fit over the plates 38, 44 and 49, and the center of the raised portion is provided with a fixed stud 56 the lower end of which extends through the slots 41, 46 and 50 of the respective plates, in assembled relationship. The supporting bracket 54 is rigidly connected to the chamber ceiling 30 as indicated at 57, in such position that the bracket 54 and the record actuating mechanism mounted thereon are spaced from the inclined floor 58 of the chamber 26 as shown in Figs. 5, 6A, 6B and 6C.

When the plates 38, 44 and 49, with the bracket 52, are assembled as shown, the pin 42 of the actuating plate 38 extends through the slot 47 of the intermediate plate 44 and engages the slot 51 of the bottom plate 49, while the pin 43 of the plate 38 engages the slot 45 of the intermediate plate 44. The operating lever 40, connected at one end to the apertured ear 39 of the plate 38, has its other end operatively connected to a plunger 25 through a bell crank lever 59, pivotally connected to a link 59', as shown in Fig. 4.

The inclined floor 58 of each chamber 26 is cut away in its center front portion as shown in Fig. 4 at 60, to facilitate removal of the records as they are dispensed from the chamber 26.

As previously explained, the machine may be made to comprise any desired number of chambers 26, each of which is designed to hold a plurality of disk records, the records in each chamber preferably differing as to recorded matter from those of the other chambers. After records have been placed on the holder 33 of the carrier device, and the carrier bar 32 has been slidably replaced in the tracks 31, the records 37 are supported in a raised position above the chamber floor, as shown in Fig. 5, with the forward edge of the lowest record of the group resting on the bottom plate 49 of the actuating mechanism heretofore described.

The operation of the dispensing mechanism will be understood by reference to Figs. 5, 6A, 6B and 6C. Fig. 5 shows the initial position of the records 37, and the position of the actuating means in Fig. 5 corresponds with that shown in Fig. 8. When the plunger 25 associated with a selected chamber 26 has been pushed inwardly part way, the operating lever 40 assumes the position shown in Fig. 9 where the actuating plate 38 has been moved pivotally about the stud 56 counterclockwise. This movement of the plate 38 causes the bottom plate 49 to be moved forwardly in the chamber 26 through engagement with the pin 42, and causes the intermediate plate 44 to be moved slightly rearwardly through engagement with pin 43 on plate 38.

Figures 6A, 6B, 6C, 7:
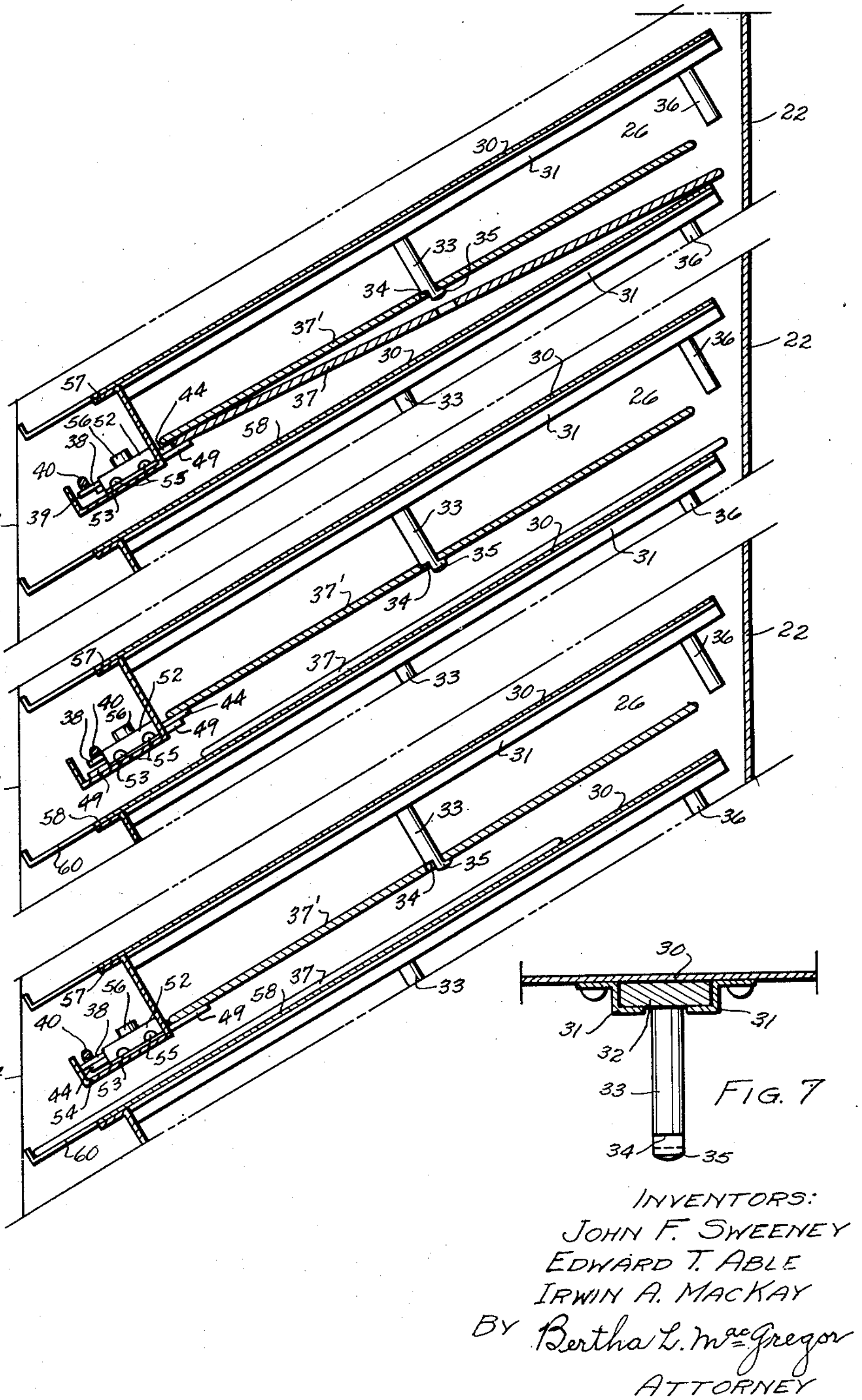
Figs. 6A, 6B and 6C are vertical sectional views similar to Fig. 5, showing a storage chamber wherein records are stored and from which they are dispensed, and showing the actuating mechanisms and the records in three different stages of the operation.
Fig. 7 is an enlarged sectional view of the record supporting means, the view being taken in the plane of the line 7—7 of Fig. 5.
Figure 8:
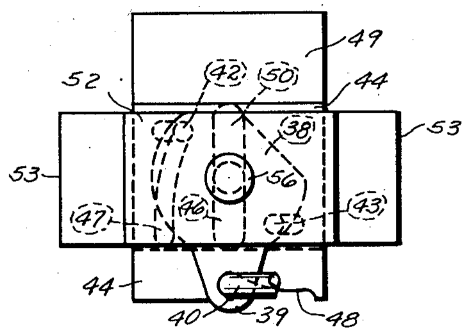
Figs. 8, 9 and 10 are plan views of part of the record actuating mechanism, in three different positions.

The movement of the plates just described results in moving the records 37 from the positions shown in Fig. 5 to the positions shown in Fig. 6A. The rearward movement of the intermediate plate 44 and the forward movement of the bottom plate 49 causes the lower record 37 to be pushed off the holder shelf 35 and to assume the position shown wherein the rearward edge of the record 37 rests on the chamber floor 58 and the forward edge of the said record rests on a small portion of the bottom plate 49. The upper of the two records, indicated at 37', has fallen into the position formerly occupied by the lower record 37.

Figure 9:
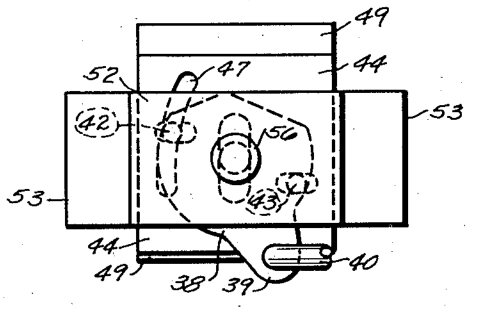
Figure 11:
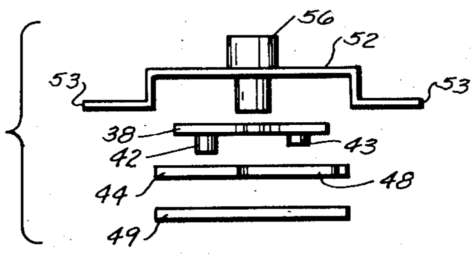
Fig. 11 is a front or edge view of several parts of the record actuating mechanism, detached from the machine and in disassembled position.
Figure 10:
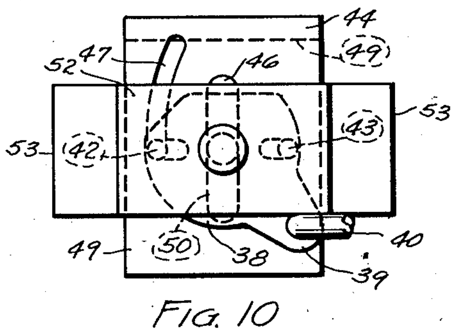
Figure 12:
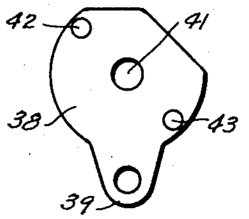
Figs. 12, 13 and 14 are plan views of three plates constituting parts of the actuating mechanism shown in Figs. 8 to 11, inclusive.
Figure 13:
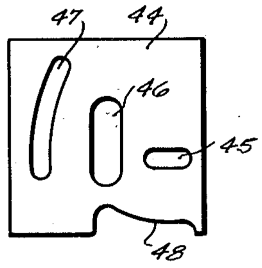

Continued inward pressure on the plunger 25 causes the operating lever 40 to move the actuating plate 38 still further counterclockwise, and to move the plates 44 and 49 from the positions shown in Fig. 9 to those shown in Fig. 10, where the bottom plate 49 has been moved forwardly to such an extent that the intermediate plate 44 extends rearwardly to a greater extent than does the plate 49. This is accomplished by movement of the actuating plate 38 and the pins 42 and 43 depending therefrom, as will be understood from the drawings.

The movement just described results in moving the records 37 from the positions shown in Fig. 6A, to those shown in Fig. 6B. The forward movement of the plate 49 allows the forward edge of the record 37 to become disengaged therefrom and to fall onto the floor 58 of the chamber 26, while the record 37′ is retained in the position formerly occupied by the record 37 on the holder shelf 35 and slightly engaged at the forward end by the plate 44.

Releasing of the plunger 25 permits the operating lever 40 and actuating plate 38 to return to initial position under influence of the spring 61 connected to the fixed stud 56 and to a link 59. This return movement of the lever 40 and plate 38 causes the bottom plate 49 to move rearwardly and the intermediate plate 44 to move forwardly into the positions shown in Fig. 6C. While this movement of the actuating mechanism is taking place, the dropped record 37 slides downwardly and forwardly on the inclined floor to a place where it is accessible to the buyer who can grasp the record as it rests over the cutaway portion 60 of the floor, and thus the record may be removed through the slot in the front wall opposite the lower portion of the chamber 26.

The suspension type of support for the records in the chambers 26 is an important feature of our invention for the reason that records can be dispensed by dropping from the holder without being deterred by any frictional engagement such as attends lateral movement of one record relatively to another of a stack of records. Furthermore, the dropping can be accomplished in a minimum of space. As previously explained, the arrangement permits of protecting the records in conventional paper envelopes and vending them as thus encased, which is a very desirable feature in this type of vending machine.

Changes may be made in details of construction, in the form of parts, and in the size and number of storage chambers, without departing from the scope of our invention as set forth in the appended claims.

We claim:

1. A disk record vending machine comprising a housing, a storage chamber in said housing, the housing having a record dispensing slot opposite said chamber, an inclined floor and ceiling in the chamber, a record carrier mounted on the chamber ceiling, said record carrier comprising a track fixed on the chamber ceiling, a bar slidable in the track and a record holder depending from the bar, said record holder being adapted to extend through a central opening in the record and having an offset shelf on its lower end for supporting said record, a contact member which engages the lowermost record on the holder, and means for actuating the contact member and thereby pushing said record off said holder shelf.

2. A disk record vending machine comprising a housing, a storage chamber in said housing, the housing having a record dispensing slot opposite said chamber, an inclined floor in said chamber, a record carrier mounted in the chamber, said record carrier comprising a track spaced from the floor, a bar slidable in the track and a record holder depending from the bar, said record holder being adapted to extend through a central opening in the record and having an offset shelf on its lower end for supporting said record, a contact member which engages the lowermost record on the holder, and manually operated means for actuating the contact member and thereby pushing said record off said holder shelf.

3. A disk record vending machine comprising a housing, a storage chamber in the housing, said housing having a record dispensing slot opposite said chamber and an opening for receiving records opposite said slot, a floor inclined downwardly toward said slot, removable means for releasably supporting a plurality of records comprising a track spaced from the floor and extending longitudinally between the slot and receiving opening, a record carrier slidably and removably mounted in the track, said carrier including a depending holder, and a handle on the carrier accessible through said receiving opening in the housing.

JOHN F. SWEENEY.
EDWARD T. ABLE.
IRWIN A. MACKAY.

REFERENCES CITED

The following references are of record in the file of this patent:

UNITED STATES PATENTS

| Number | Name | Date |
|---|---|---|
| 778,935 | Wilson | Jan. 3, 1905 |
| 1,058,144 | Blank | Apr. 8, 1913 |
| 1,879,522 | Saliba et al. | Sept. 27, 1932 |
| 1,931,487 | Collison et al. | Oct. 24, 1933 |
| 2,141,684 | Diemer | Dec. 27, 1938 |

FOREIGN PATENTS

| Number | Country | Date |
|---|---|---|
| 671,459 | France | Sept. 2, 1929 |